Figure 1:
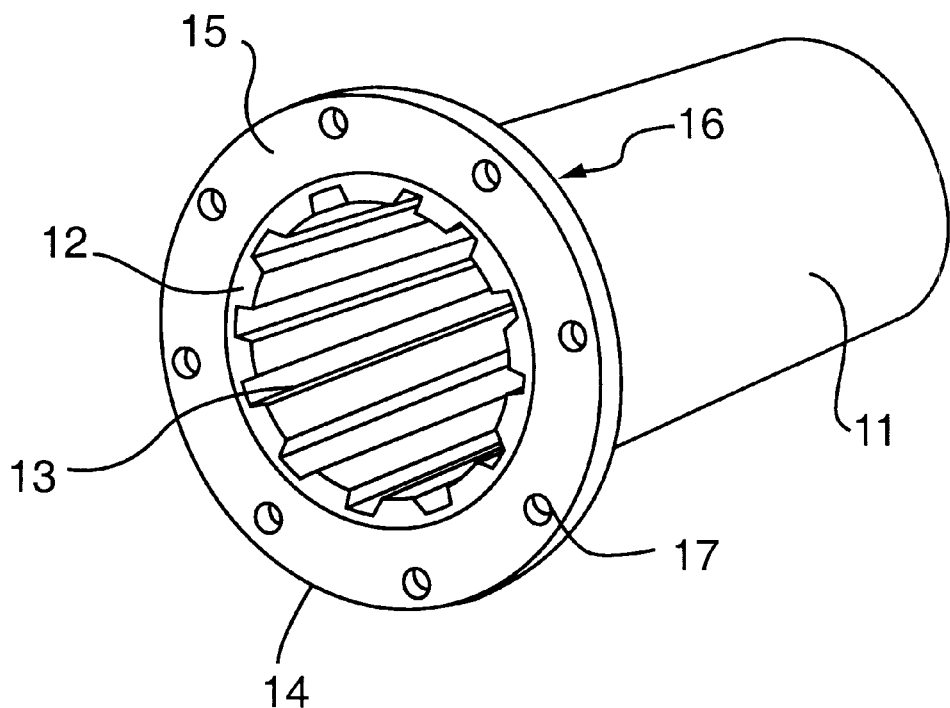

United States Patent [19]
Matthews

[11] Patent Number: 5,980,112
[45] Date of Patent: Nov. 9, 1999

[54] WATER LUBRICATED BEARING

[75] Inventor: Kenneth Thomas Hendy Matthews, Cornwall, United Kingdom

[73] Assignee: Countrose Engineering Ltd., United Kingdom

[21] Appl. No.: 08/862,466

[22] Filed: May 23, 1997

[51] Int. Cl.⁶ ................................................. F16C 33/22
[52] U.S. Cl. ........................... 384/98; 384/275; 384/296
[58] Field of Search ................................ 384/97, 98, 275, 384/296

[56] References Cited

U.S. PATENT DOCUMENTS

| | | |
|---|---|---|
| 3,455,613 | 7/1969 | McGrath ................................. 384/97 |
| 3,932,004 | 1/1976 | Orndorff, Jr. ........................... 384/97 |
| 4,473,308 | 9/1984 | Kramer ................................... 384/98 |
| 4,570,315 | 2/1986 | Kramer ............................... 384/98 X |
| 4,677,721 | 7/1987 | Kramer ............................... 384/98 X |
| 5,518,318 | 5/1996 | Orndorff, Jr. ........................... 384/98 |

*Primary Examiner*—Thomas R. Hannon
*Attorney, Agent, or Firm*—Harold L. Novick; Nath & Associates

[57] ABSTRACT

A water-lubricated bearing comprises a cylindrical shell and a resilient liner, said shell being formed from a hard plastics material by a casting process and including an integral outwardly radially-directed flange at one end region thereof. The bearing may be made by initially forming the liner from a curable plastics material and curing the said material and thereafter forming the shell by casting a settable material in situ about the liner.

14 Claims, 1 Drawing Sheet

WATER LUBRICATED BEARING

This invention relates to bearings and especially to water-lubricated bearings.

Water-lubricated bearings for rotating shafts in aqueous, typically marine, environments may be used in applications ranging from small leisure craft, for supporting the propeller shaft, to commercial vessels such as dredgers, for supporting the cutter shaft. Such bearings are also used extensively in pumps, again often in marine environments. The bearings generally comprise a cylindrical rigid shell and a resilient fluted liner which is designed to admit water between the liner and the shaft so that, on rotation of the shaft, a dynamic film of water builds up between the bearing and shaft surfaces, so lowering the coefficient of friction. The shell may be formed from metallic materials such as brass, bronze or stainless steel or from a hard plastics material and the liner is traditionally formed from a nitrile rubber material although, recently, polyurethane rubber has been more extensively used in that it provides enhanced wear resistance especially in aggressive environments or where loadings are high. For example, a dredger cutter-shaft bearing having spiral flutes may have a diameter of 750 mm and is required to operate under conditions of high radial loadings, high compression stresses and low peripheral speeds (which tend to militate against the establishment of a dynamic water film) in highly abrasive environments. For such applications, polyurethane liners are superior to nitrile materials.

Traditionally, bearings of the type described are manufactured by initially forming the shell by a centrifugal casting process and machining and subsequently casting the liner as a liquid composition which is then cured, a suitable adhesive being first applied to the inner wall of the shell. However, the liner material tends to shrink or contract on cooling or curing, thereby exerting a tensile force between the shell and the liner. This problem, which in the extreme would cause at least partial detachment of the lining from the shell, is particularly noticeable with polyurethane materials which have a higher coefficient of contraction than nitrile materials.

Conventionally, bearings in use are inserted in a suitably-sized cavity in a casting and are held in place with grub screws. However, the bearings are difficult to remove for replacement when they become worn It is therefore an object of the present invention to provide a bearing having a flange formed at one end of the shell, to facilitate removal of the bearing from its working position for servicing or repair purposes.

It is another object of the present invention to provide a method of manufacture of bearings of the water-lubricated type which avoids problems due to shrinkage of the liner material.

According to one aspect of the present invention, a bearing comprises a cylindrical shell and a resilient liner, in which the shell is formed from a hard plastics material by a casting process and includes an integral outwardly radially-directed flange at one end region thereof.

The flange may have a rectangular cross-sectional profile or may be at least partially curved in profile according to the functional requirements thereof. The edge of the flange may also be facetted for example to enable it to be gripped and twisted axially by mechanical jaw members for insertion in or removal from its working position. Flanges especially having a rectangular cross-sectional profile may be drilled and optionally threaded to receive fixing bolts or studs.

According to a further aspect of the present invention, a method of manufacture of a bearing comprising a cylindrical shell and a resilient liner comprises initially forming the liner from a curable plastics material and curing the said material and thereafter forming the shell by casting a settable material in situ about the liner.

Preferably the liner is internally supported during the casting of the shell, to maintain the desired internal diameter and profile of the liner while casting and cooling or curing of the shell takes place.

In bearings according to or manufactured according to the invention, the settable material used for forming the shell is preferably a hard plastics material, settable by polymerisation, provided that it has the requisite physical properties and chemical inertness to the intended working environment. For example, the shell material may be a hard-grade polyurethane polymer which itself shrinks on curing, thereby enhancing the interfacial bond between the shell and the liner, although it is preferred to use an adhesive to resist any tendency for the liner to turn within the shell in use. Accordingly, it is a preferred step in the method of the invention to apply a layer of adhesive to the outer surface of the cured liner before the step of casting the shell. Preferably, the cured polymer is substantially non-porous and non-hygroscopic, whereby it does not swell in the presence of water and is suitable for use in marine environments.

One advantage of the method according to the invention is that the shrinkage properties of the liner material do not cause any adhesion problems in tending to detach the liner from the shell but another advantage is that, since the external surface of the liner acts as the effective inner wall of the mould for casting the shell, the external surface of the liner may itself be fluted or be formed with other mechanical keying formations which will increase the interfacial area and bond strength between the shell and the liner and will enhance the resistance of the liner to twisting in use within the shell, such twisting otherwise leading to failure of the bearing material.

Bearings made by the method according to the invention may include an outwardly radially-directed flange at one end region of the shell thereof, the flange being cast integrally with the shell. However, flanged shells may also be pre-formed and have the liner cast subsequently. Bearings produced by either method may be externally machined to the size required for the intended use but are preferably cast to the required finished dimensions.

The liner should be formed from a soft, wear-resistant material which is wettable by water. Suitable materials include nitrile rubbers and polyurethane plastics materials. Nitrile rubbers are synthetic polymers formed from acrylonitrile and butadiene. The internal surface of the liner will generally comprise flutes which may be axial or helical according to the intended use and the external surface of the liner may also comprise flutes or other mechanical keying formations which interlock with the shell material, the latter forming an intimate interfacial bond therewith by virtue of the manufacturing method.

Figure 2:
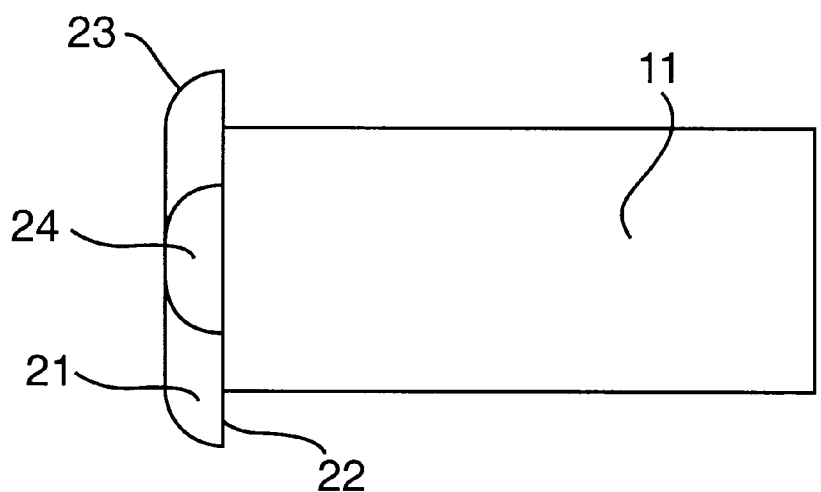

Embodiments of the invention will now be described by way of example with reference to the accompanying drawings, of which:

FIG. 1 is a perspective view of a bearing having an integrally-cast flange having a rectangular cross-sectional profile, and FIG. 2 is an elevation of a bearing having a curved edge profile.

Referring to FIG. 1, the bearing consists of a shell 11 and a liner 12. The liner, pre-cast from a soft polyurethane available from Uniroyal under the designation "L100", has axial corrugations 13 formed in its inner wall surface. The shell is formed from a hard grade rigid polyurethane plastics material ("Royalcast"-available from Uniroyal) and is cast around the pre-formed liner, whereby the outer wall of the liner acts as the inner surface of the casting mould. The temperature at which the polyurethane material is castable should be lower than the temperature at which the nitrile rubber softens or otherwise loses its integrity. The shell 11 is formed at one end with a flange 14 having a rectangular profile, whereby both annular faces 15, 16 are orthogonal to the axis of the bearing. The flange is formed with holes 17 to receive fixing bolts.

Referring to FIG. 2, the bearing is similar to the bearing shown in FIG. 1 but has a flange 21 having a plane annular face 22 directed inwardly, that is, orthogonal to the cylindrical wall of the shell, and an outwardly-directed curved edge profile 23. The flange is provided with diametrically-opposed flat surfaces 24 to enable it to be gripped between the jaws of a wrench. The bearing would normally be held in place in use by one or more grub screws (not shown). On removal of the grub screws, the bearing is able to be removed but would normally be a close fit in the cavity in the casting; the ability to grip the flange to exert a twisting and/or pulling force is therefore beneficial. As shown in FIG. 2, the distance between the flat surfaces is the same as the external diameter of the shell so that the flat surfaces are at their mid-points effectively tangential to the outer surface of the shell.

What is claimed is:

1. A water-lubricated bearing comprising a cylindrical shell and a resilient liner, said shell being formed from a castable polymerised plastics material and including an integrally-formed outwardly radially-directed flange at one end region thereof.

2. A bearing according to claim 1, wherein the flange has a rectangular cross-sectional profile.

3. A bearing according to claim 1, wherein the flange is at least partially curved in profile.

4. A bearing according to claim 1, wherein the edge of the flange is facetted.

5. A bearing according to claim 1, wherein the castable polymerized plastics material of the shell comprises a hard-grade polyurethane polymer.

6. A bearing according to claim 1, including a layer of adhesive between said shell and said liner.

7. A bearing according to claim 1 wherein the liner is formed from a soft wear-resistant material which is wettable by water.

8. A bearing according to claim 7, wherein the liner material comprises a nitrile rubber or a polyurethane plastics material.

9. A bearing according to claim 1, wherein the flange is drilled to form holes to receive fixing bolts or studs.

10. A bearing according to claim 9, wherein said holes are threaded.

11. A bearing according to claim 10, wherein the castable polymerised plastics material of the shell comprises a hard-grade polyurethane polymer.

12. A bearing according to claim 11 wherein the liner is formed from a soft, wear-resistant material which is wettable by water.

13. A bearing according to claim 12, wherein the liner material comprises a nitrile rubber or a polyurethane plastics material.

14. A bearing according to claim 13, including a layer of adhesive between said shell and said liner.

* * * * *